United States Patent
Kay

(10) Patent No.: US 7,080,473 B2
(45) Date of Patent: Jul. 25, 2006

(54) NOVELTY ANIMATED DEVICE WITH SYNCHRONIZED AUDIO OUTPUT, AND METHOD FOR ACHIEVING SYNCHRONIZED AUDIO OUTPUT THEREIN

(75) Inventor: Robert Kay, Wilmslow (GB)

(73) Assignee: Virtual Video UK Ltd. (GB)

( * ) Notice: Subject to any disclaimer, the term of this patent is extended or adjusted under 35 U.S.C. 154(b) by 624 days.

(21) Appl. No.: 09/914,366

(22) PCT Filed: May 16, 2001

(86) PCT No.: PCT/GB01/02146

§ 371 (c)(1),
(2), (4) Date: Jan. 30, 2002

(87) PCT Pub. No.: WO01/91093

PCT Pub. Date: Nov. 29, 2001

(65) Prior Publication Data
US 2003/0027489 A1    Feb. 6, 2003

(30) Foreign Application Priority Data

| May 24, 2000 | (GB) | ................................... 0012470 |
| Jul. 5, 2000 | (GB) | ................................... 0016517 |
| Jul. 18, 2000 | (GB) | ................................... 0017548 |
| Aug. 3, 2000 | (GB) | ................................... 0018940 |
| Nov. 10, 2000 | (GB) | ................................... 0027656 |
| Nov. 14, 2000 | (GB) | ................................... 0027717 |
| Nov. 14, 2000 | (GB) | ................................... 0027719 |

(51) Int. Cl.
G03B 25/02    (2006.01)

(52) U.S. Cl. ........................ 40/454; 345/473

(58) Field of Classification Search ................. 40/454, 40/455, 457, 464; 345/108–111
See application file for complete search history.

(56) References Cited

U.S. PATENT DOCUMENTS

| 2,867,049 A | 1/1959 | Brackensey |
| 2,871,593 A | 2/1959 | Roberts |
| 4,107,462 A | 8/1978 | Asija ........................ 40/457 X |
| 4,139,968 A | 2/1979 | Milner |
| 4,207,704 A | 6/1980 | Akiyama .................. 40/457 X |
| 4,642,710 A | 2/1987 | Murtha et al. ............ 40/457 X |

(Continued)

FOREIGN PATENT DOCUMENTS

EP    0 982 701 A2    3/2000

(Continued)

Primary Examiner—Joanne Silbermann
(74) Attorney, Agent, or Firm—Woodard, Emhardt, Moriarty, McNett & Henry LLP

(57) ABSTRACT

A method for creating realistic synchronization of a sound sample including speech to the motion of a lenticular image is disclosed, together with a device for achieving such synchronization. The device includes a lenticular image consisting of a number of different individual images spliced together and printed on a substrate which can be moved relative to a lenticular screen to give the appearance of animation that the lenticular image. The sound sample is ideally stored in the memory of a sound chip and the synchronization is achieved using a processor. In accordance with the invention, the synchronization is achieved in a realistic and intrinsically simple manner by using a lenticular image which consists only of a few individual images taken from a sequence of a character or person opening and closing its mouth thus resulting in a very short animation sequence and using electronics to repetitively animate the sequence for substantially each and every syllable pronounced in the speech within the sound sample.

37 Claims, 12 Drawing Sheets

U.S. PATENT DOCUMENTS

| | | |
|---|---|---|
| 5,004,442 A | 4/1991 | Lemelson et al. |
| 6,078,424 A * | 6/2000 | Morton |
| 6,125,190 A * | 9/2000 | Wen .................... 40/454 X |
| 6,532,690 B1 * | 3/2003 | Vachette et al. .............. 40/454 |
| 6,665,643 B1 * | 12/2003 | Lande et al. ................ 704/266 |
| 6,735,566 B1 * | 5/2004 | Brand ........................ 704/256 |

FOREIGN PATENT DOCUMENTS

| | | |
|---|---|---|
| GB | 2 304 252 A | 3/1997 |
| GB | 2 312 349 A | 10/1997 |

* cited by examiner

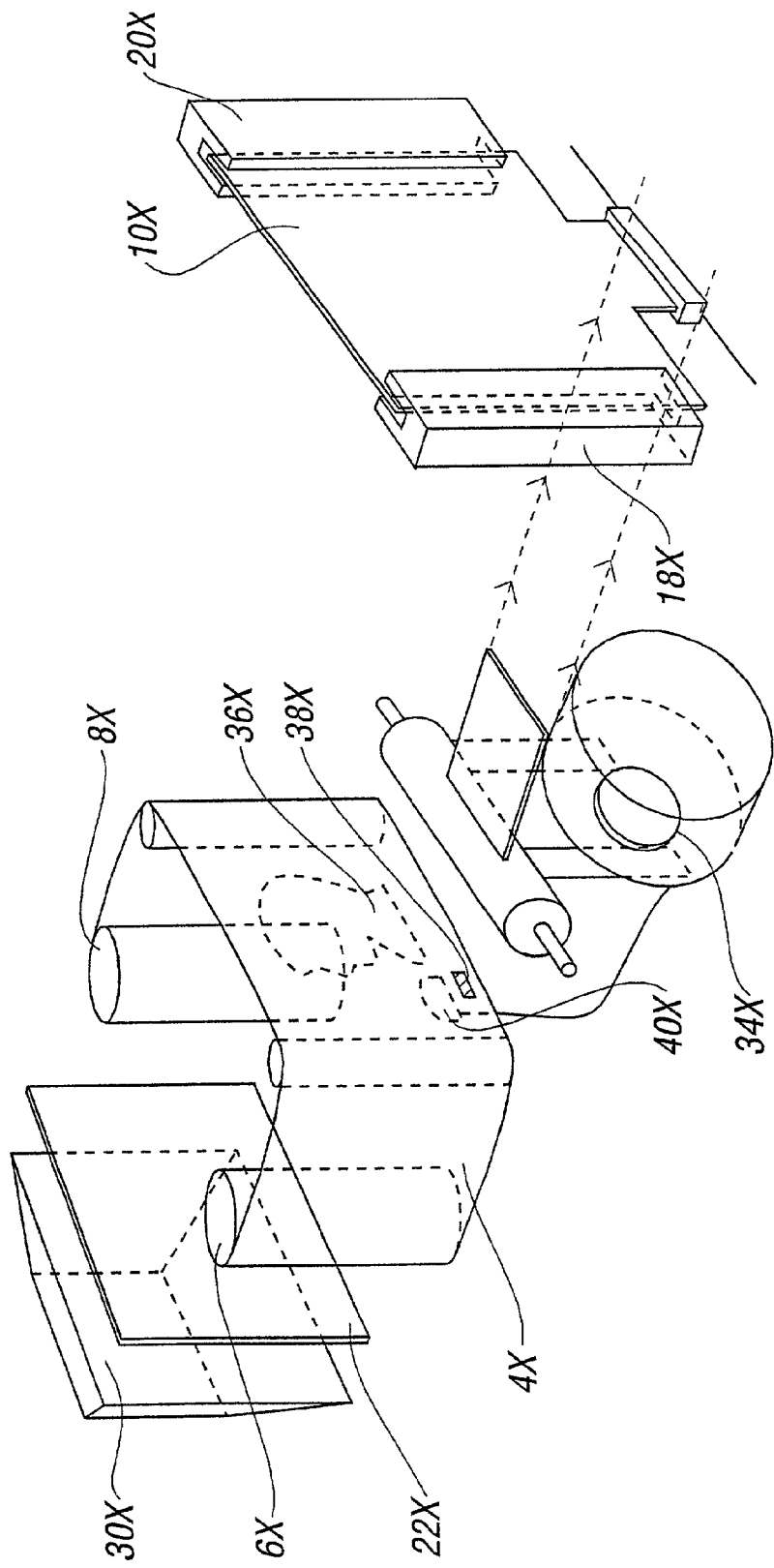

NOVELTY ANIMATED DEVICE WITH SYNCHRONIZED AUDIO OUTPUT, AND METHOD FOR ACHIEVING SYNCHRONIZED AUDIO OUTPUT THEREIN

This invention relates to a novelty animated device with synchronised audio output. The reader will be aware of currently available devices including a lenticular screen with an image therebehind which when rotated by user or when the user moves relative to the device displays a number of different images to give the effect of animation of said image, and the invention relates specifically to an improvement of this known device.

Although the following description is provided with exclusive reference to lenticular and grid screens and their combination with audible sound production means, it will be appreciated from the following description that the invention has application to any image display device capable of displaying a sequence of images which when operated sufficiently quickly gives the viewer the impression of an animation sequence by virtue of the particular physical orientation of said device, or of the particular relative displacement of the elements of said device.

Lenticular image display devices comprise a film (which may be translucent) having printed thereon an image which is created by splicing together a number of different images representative of an animation sequence, and a translucent lenticular screen having a plurality of individual lenses arranged in parallel over the width or height of the screen. The composite device is commonly rotated through a predetermined angle so that the portions of the image on the film beneath which correspond to each of the different images spliced together in making the film are viewable separately by virtue of the lenticular screen which selectively directs and expands each of these image portions. Depending on the process used to create the spliced image on the film, there may be typically between 2 and 10 images spliced together so that between 2 and 10 images are subsequently viewable depending on the particular orientation of the composite device. Hence where only two images are viewable through the lenticular screen only relatively limited animation is obtainable, the first and second images usually being of a character or other item in a first and second position, for example an eye in an open and closed condition.

The term animation as used hereinafter is intended to cover any change apparent to a viewer of a spliced image through a lenticular screen, including the "binary" type of operation described above when only two images are used in the creation of the spliced image. Obviously, a smoother animation can be achieved if a plurality of images are spliced together.

GB2304252 describes a method of creating a composite lenticular screen device wherein many images can be spliced together on a recording film resulting in a smooth animated sequence of images when the spliced image is viewed through a suitable lenticular screen. The method includes the step of moving a mask or screen having a number of slits therein relative to an image projector in the form of an electronic display device such as a television or computer monitor which displays the images to be spliced together consecutively. The resulting effect on the recording film is that bands of each of the images in the sequences are laid onto the film adjacent one another in a precise manner. Subsequent laminating of a suitable lenticular screen dependent on the slit screen used during the process results in a composite image display device on which smooth animation (resulting from the increased number of images which can be spliced together using the process) is viewable when the device is tilted through a predetermined angle in the light.

This UK patent also mentions the incorporation of an audio output into the composite device which is synchronised for activation during the appropriate portion of movement of the device. For example, the device may be arranged to include a sound chip arranged for activation and for an audio emission which is relevant to the animated sequence being viewed when the device reaches a particular angular inclination. Advantageously, the device is arranged to present a starter image which represents a starting point for activation of the audio output means so as to achieve both the required motion sequence and also the appropriate synchronised audio output.

This type of operation is satisfactory for only relatively view type of animation where only one or two images within the animated sequence suggest that noise might be produced. In the example given above, there may be many separate images of a striker moving towards the gong in the image sequence, but only when the final image where the gong is actually struck was viewable would there be a requirement for sound to be produced. For example, the device herein described could not be used to provide a realistic representation of speech in synchronicity with the animation sequence.

European Application Number EP982701 describes a device similar to that of GB2304252 and specifically relates an article having a lenticular image formed thereon and a sound generating mechanism associated therewith for generating a sound message wherein the sound message is coordinated with respect to the movement of the article. There is mention of the concept of repeatedly moving the lenticular screen back and forth in coordination with the particular sound sample being played so as to provide the device with the appearance of a moving televisual or video image accompanied by suitable sound, whether speech, music, comments, notes, or other sounds pertinent to the animated image sequence being viewed.

This European application further mentions an alternate means of displaying the individual images spliced together in the spliced image wherein the spliced image film is moved perpendicularly with respect to the individual parallel lenses in a lenticular screen behind which said film is disposed. In order to view all of the individual images spliced together, the spliced image film must be adjacent the lenticular screen but free for relative movement therewith. All the images spliced together in the image film are displayed successively when said image film is moved a total distance equal to the width of one of the lenticules in the screen, which may be in the region of 1 mm.

Specifically, EP982701 describes the process of synchonising the rate of movement of the lenticular image with the sound produced by a sound chip by means of sampling frames of a video or film sequence at an appropriate sampling rate and splicing together the various images into a single lenticular image, as generally described in GB2304252. Additionally, the sound track to this video or film sequence is also sample at an appropriate rate from the first frame to the last frame of the various images within the lenticular image, thus producing a faithful digital representation of the actual sound track played between the first and last captured frames of the film or video sequence. As a result, one can then calculate the appropriate motion of the device so that the individual images spliced together in the lenticular image are displayed to an observer seemingly in synchronisation with the audio playback. It is also stated in this document that the appropriate data may be embedded into electronics of the motor causing the motion of the device.

The fundamental disadvantage of the devices described in EP982701, and to a certain extent in GB2304252 is that they are unnecessarily complicated. For example, sound generation circuitry described in EP982701 includes drive electronics which operatively drive a stepper motor and coordinate the motion of the stepper motor with the activation of a sound chip and speaker. Alternatively a mercury tilt switch having a number of different contacts may be embodied into the device such that when the device is tilted through progressively greater angles (and thus different images from those spliced together in the spliced image are viewable), a number of different sounds, for example different segments of speech or music, is emitted through the speaker. A significant amount time is required to effectively calibrate and/or synchronise the sounds with the particular images or image sequence for which they are relevant.

This European application also describes the use of sensing means to determine the position of an observer of the device so that suitable sounds can be emitted depending on the particular location of the observer relative to the device. This embodiment results from the realisation that various images within the spliced image can be viewed individually if either the device is rotated relative to a stationary observer, or if the observer moves relative to the stationary device.

Unfortunately, the abovementioned patent documents do not address the fundamental difficulty with the transformation of an actual viewable video or film clip having an associated sound track (such as might be recorded on a video cassette for playback on a television) into an essentially simple device having a moveable lenticular image and an associated sound chip. As mentioned above, it is generally only possible to sample the video clip at a very low rate, as only a relatively small number of actual images can be spliced together into the single lenticular image, and this number is certainly nowhere near the number of frames in the clip. Henceforth, although it is possible to sample the video clip at a low rate to effectively condense the clip into only a few discreet images which can be spliced together in a lenticular image, it is impossible to do this with the sound track which must be sampled at a reasonably high rate so that the sampled signal provides a faithful representation of the original.

Therefore although the reproduced sound signal may be immediately recognisable as the original sound track, and furthermore this may be replayed in the same time that the lenticular image takes to move through its complete animation, the resulting effect is not one of faithful recreation of the original film or video clip. In particular, although the individual images within the lenticular image as the lenticular image is moved appear to the observer at the same time that the particular frames in the video or film clip would appear, and the sound playing at that time would be essentially the same as that in the original sound track (and thus the sound signal and the motion signal are effectively synchronised), the resulting effect is not continuous, particularly where the video or film clip is of a person or character speaking and the sound track is their speech.

It is an object of this invention to provide a device which mitigates the above disadvantages by providing a simple means of not only synchronising sound to an animated sequence in an image display device, but also to provide a device in which the synchronisation of sound, particularly speech, with the animated sequence in a realistic, aesthetically appealing and optionally humorous manner.

According to the present invention there is provided a method for use in connection with a novelty device having a lenticular image selectively caused to move by a drive mechanism and associated sound generating means both of which are controlled by electronics, the movement of said lenticular image allowing the viewing of a plurality of discreet images consecutively which together make up an animation sequence and the method allowing the novelty device to give the appearance that the sound emitted thereby is synchronised to the animation, said method including the steps of delivering a sound signal representative of a sound sample of a predetermined duration to the sound generating means which reproduce said sound sample, deriving a drive signal from said sound signal either in real time or prior to delivery of said sound signal to said sound generating means and delivering said drive signal to said drive mechanism to cause movement of said lenticular image, characterised in that the animation sequence viewable during the motion of the lenticular image is repeated a number of times and for varying periods of time determined by the drive signal during the time that the single sound sample is reproduced by the sound generating means to give the appearance that the animation sequence is of the same duration as the sound sample and that said animation sequence is synchronised with the sound sample.

Preferably the sound signal is pre-programmed.

Preferably the lenticular image consist of a plurality of individual images spliced together, each of said images being of the face of a person or character having a mouth in varying stages of openness. Ideally the sound sample consists substantially of speech.

Most preferably, the initial image viewable in the animation sequence is that of the face of a character or person having their mouth closed, the animation sequence showing that character or person subsequently opening and then closing their mouth.

In one embodiment, the drive signal is derived prior to the delivery of the sound signal to the sound generating means, and specifically where the sound sample consists substantially of speech, the drive signal is derived such that the animation sequence is repeated for each syllable of speech reproduced by the sound generating means.

Most preferably, the duration of each repetition of the animation sequence which is determined by the drive signal varies between each repetition depending on the length of each syllable of speech contained in the sound sample.

Most preferably the drive signal is ramped at both the beginning and end of each peak to cause the gradual as opposed to stepwise motion of the lenticular image to give the impression that the mouth of the character or person seen in the animation sequence opens and closes gradually. Such ramping may either be embodied in the drive signal or alternatively the drive signal may be in the form of a square wave and the motion of the lenticular image or an element thereof may be suitably damped to prevent the binary type motion of the lenticular image or an element thereof which would result in a jerky and stilted animation sequence.

Most preferably the peaks in the drive signal are maintained for a suitable time depending on the duration of a particular syllable in the speech which constitutes the sound sample.

In an alternative embodiment, the drive signal is determined in real time electronically using a processor to which the sound signal is delivered in addition to its delivery to said sound generating means, said processor analysing said sound signal for characteristic peaks indicative of syllabic enunciation in speech and creating said drive signal when said characteristic peaks exceed a predetermined level.

According to the invention there is provided an image display device comprising a lenticular image which allows the display of a plurality of individual images in succession by means of the displacement of one or more of the elements of the lenticular image to provide an animation sequence, said device further comprising sound generation means capable of converting a sound signal into sounds of a predetermined duration being sounds of the type an observer would expect to hear on seeing the animation sequence, said lenticular image being displaced by a drive mechanism actuated in response to a drive signal to allow an observer to see the animation sequence, said drive signal being derived manually or electronically from said sound signal in real time or prior to the delivery of said sound signal to the sound generation means, said driver signal being delivered to said driver means substantially simultaneously with the delivery of the sound signal to the sound generation means, characterised in that in that the animation sequence viewable during the motion of the lenticular image is repeated a number of times and for varying periods of time determined by the drive signal during the time that the single sound sample is reproduced by the sound generating means to give the appearance that the animation sequence is of the same duration as the sound sample and that said animation sequence is synchronised with the sound sample.

In one embodiment the drive signal and sound signal are combined into a single signal delivered to the sound generation means which causes the reproduction of the sound sample by means of speaker coil movement, said drive mechanism consisting of a mechanical link between the moving element of said sound generation mechanism and the lenticular image or an element thereof.

In an alternative embodiment, a combined sound and drive signal is stored in the memory of a sound chip and passed through a circuit which splits the drive signal from the sound signal for subsequent delivery of each respectively to drive mechanism and sound generation mechanism.

Preferably the drive mechanism is any mechanism which produces a positive mechanical displacement dependent on the magnitude and/or direction or sign of the current through or potential difference across the mechanism. Examples include a stepper motor, a transducer, a mechanically driven cam arrangement wherein the lenticular image or an element thereof rests on the cam which is driven by a motor or a moving magnet or moving coil arrangement mechanically linked to the lenticular image to cause displacement thereof.

Preferably the maximum amplitude of motion achievable by the mechanism is less than 2 mm, and most preferably less than 1 mm, and ideally between 0.1 and 0.4 mm. Obviously these values depend on the width of the lenticules through which the lenticular image is viewed.

In an alternative arrangement, the lenticular image or the element thereof which is moved to cause the display of the animation sequence is mounted between or suspended by conductors having a propensity to elongate or contract depending on their temperature or the electric current or voltage passed therethrough. In this manner, the drive signal can be passed through such "muscle" wire to cause the movement of the lenticular image or an element thereof. Other arrangements may be considered.

Alternatively the drive mechanism may include a piezoelectric element.

In an alternative embodiment, the device includes processor means which controls the operation of both a sound chip and the drive mechanism on receipt of an initiation signal ensuring that the sound signal and the drive signal are delivered to respective sound generation means and drive mechanism simultaneously.

In the case where the processor derives the drive signal in real time, this is preferably achieved by means of an algorithm programmed into the processor or provided in memory associated therewith.

Preferably the programmed algorithm effects some form of peak detection or threshold limitation on the sound signal to derive the drive signal so that the drive signal is largest when a characteristic of said sound signal, such as its amplitude, pitch or frequency is greatest.

Preferably the displacement of said driver means, and thus the amplitude of the drive signal is a function of the intensity or amplitude of said sound signal.

Preferably filter means are employed to remove high frequency artefacts from the sound signal prior to imposition of the threshold limitation on said signal.

In a particularly preferred embodiment of the invention, the device is provided with a sound chip having memory associated therewith in which are stored a plurality of different sound signals representative of different sound samples, and the processor communicates with both the said sound chip and one or more sensors which deliver a sensor signals to said processor which subsequently causes the delivery of one or other of the stored sound signals to the sound generation means.

Most preferably for each stored sound signal there is an associated derived drive signal stored in memory associated with the processor.

Alternatively, the processor may derive drive signals corresponding to each of the stored sound signals in real time.

In one preferred embodiment, there are a plurality of sensors, and the processor causes playback of one of the complete sound samples depending on which sensor was activated. This embodiment has particular use for example on a race track of a child's racing game wherein the track is provided with a plurality of sensors and as a car moves over each sensor, a different message is played back in synchronisation with a suitable animatable image, for example that of the face of a commentator.

In another preferred embodiment, a single sensor is provided, and the particular lenticular image to be animated is changeable, the playback of a particular sound sample being dependent on the sensor signal received by the processor which is indicative of the particular image being displayed. In this manner a number of different images can easily and simply have particular sound samples associated with them. For added play value, there may be a facility for re-programming (in particular re-arranging the storage order) the sound chip so that on receipt of a particular sensor signal, a different stored sound sample is played back. This could increase the play value of the device because a user could then generate unusual effects in that although animation of the image still occurs in synchronisation with the sound sample played back (as any drive signals corresponding to the sound signals stored in processor-associated memory would also be suitably re-arranged), the sound sample is not one which would be expected from the image displayed.

Preferably a change of displayed image is controlled internally of the device, possibly by remote control. For example, a scroll having a plurality of individual images thereon may be caused to be unwound or wound behind a lenticular screen so that the image to be animated by movement of the lenticular screen as opposed to the image.

Alternatively, the user may place different image cards in a suitably shaped receiver, the sensor means detecting which of a plurality of images has been inserted and causing playback of the relevant sound sample associated with that image.

In either instance, the scroll of individual images or the individual image cards may have indicator means proximate an edge thereof which can be detected by the sensor and a suitable signal relayed to the processor to inform same which particular image is currently being displayed and accordingly which sound sample should be played back during animation thereof.

In a modified aspect of the invention, it is preferable that the processor communicates with memory incorporated in a mobile telecommunications device into which one or more sound samples can be downloaded.

It is yet further preferable that said processor prevents the delivery of a particular sound signal representative of a particular sound sample unless a successful comparison is achieved between a sensor signal and an signal identifying a particular sound signal. This prevents the playback of sound samples which are not appropriate to the lenticular image at that time inserted in the device.

Preferably, said processor receives the identifying signal from said mobile telecommunications device containing said particular sound sample prior to playback thereof.

In this particular embodiment, the device could be sold as an optional extra for mobile telephones. For example, recent developments in mobile telephones allows users thereof to connect to the Internet and download a desired sound sample for use in place of the conventional ringing tone of the mobile. As a development of this concept, the device of the invention could be provided as an attachment to the telephone and provided with a connector to allow the processor in the device to access the native memory internally of the telephone. When a call is made to a mobile telephone previously adapted and provided with a suitable lenticular image animation device, the lenticular image could be animated simultaneously and in synchronisation with the sound sample played back in place of the conventional ringing tone.

This arrangement allows a user to personalise a telephone with a particular lenticulated image of a pop star or other celebrity whose song or familiar sound bite can be downloaded onto the phone for playback either as the ringing tone when a call is received, or simply when activated by a user. The comparison effected by the processor in accordance with the invention would ensure that only sound samples of pop songs or sound bites belonging to the particular celebrity could be played back.

Most preferably the image display device comprises a lenticular screen having a plurality of lenticules extending parallel to one another across the width or height of said screen underneath which is disposed a spliced image being comprised of a plurality of individual images spliced together. The reader will appreciate that any direction selective device which obscures certain portions of a spliced image or pronounces certain portions of a spliced image more than others so as to give the appearance of a single image may be used, and such direction selective devices include lenticular screens, grids and diffraction gratings.

Preferably the pitch of the lenticular screen in terms of lenses per inch is between 20 and 250.

Preferably said spliced image is printed on a substrate, which may be either translucent or opaque.

Most preferably the drive mechanism causes linear displacement of the substrate relative to the lenticular screen in a direction perpendicular to the lenticules within said lenticular screen, although it is to be mentioned that the driver means may just as effectively cause a rotational displacement of the entire lenticular screen and substrate as this provides the observer with an identically animated image sequence.

In circumstances where the image display device produces an animation sequence of a character opening and closing its mouth, the relative displacement between lenticular screen and spliced image may also be angular as opposed to linear.

In some circumstances the driver means is preferably calibrated so that the largest relative displacement which can be effected is equal to or less than the width of a single lenticule, but as the animation sequence merely repeats if the image is moved relative to the lenticular screen by a distance greater than the width of a single lenticule, the driver means may be calibrated accordingly.

Hence according to the invention the observer does not move, nor does the observer need to rock or tilt the integrated spliced image and lenticular screen, but rather the observer is static and the printed image is moved by electronic or mechanical means relative to a fixed lenticular screen. By repeatedly causing movement of the lenticular image to display the animation sequence for varying periods of time while simultaneously reproducing a sound sample, a combined replay of synchronised sound with synchronised motion is realistically and inexpensively achieved. The result is a low cost viewer displaying animation synchronised with audio output without the need for more costly electronic display screens which additionally require significantly more power to drive same.

In particular, the primary advantage of the low cost of the device of the invention stems from the very inexpensive process for splicing together a few discreet images representative of only a very short portion of a film or video clip (for example a portion of the clip where a character merely opens and closes his mouth) combined with the relatively inexpensive integrated circuits, control software, programming expertise and optionally processors required to realise a working device.

A further surprising feature of the invention is that the realism with which synchronisation of sound to animation is achieved is actually dependent on an idiosyncracy of human perception. The realism of the synchronisation is enhanced by ensuring that the animation sequence is repeated and maintained for each syllable of speech in the sound sample, whereas in reality, a person's mouth will not actually close during pronunciation of certain words. For example the word "actually" contains four syllables, but a person speaking this word would only close their mouth after having pronounced the word, intra-word syllables being glottally pronounced. In accordance with the invention, there may be three or four repetitions of the animation sequence of different durations so that the observer is given the impression that the character is speaking each syllable of the word.

It is to be mentioned that certain syllables of words may not require a separate animation sequence, but in general, the majority of syllables will.

It is perceived by the applicant that the device may be incorporated into an incredibly diverse array of products such as greeting cards, mobile telephones, fruit machines reels, toys, and indeed any article in which a novelty feature may be of advantage.

A specific embodiment of the invention is now provided by way of example with reference to the following drawings wherein:

FIGS. 8A and 8B show respectively schematic views of the various components incorporated in the device of FIG. 1.

Figure 1:
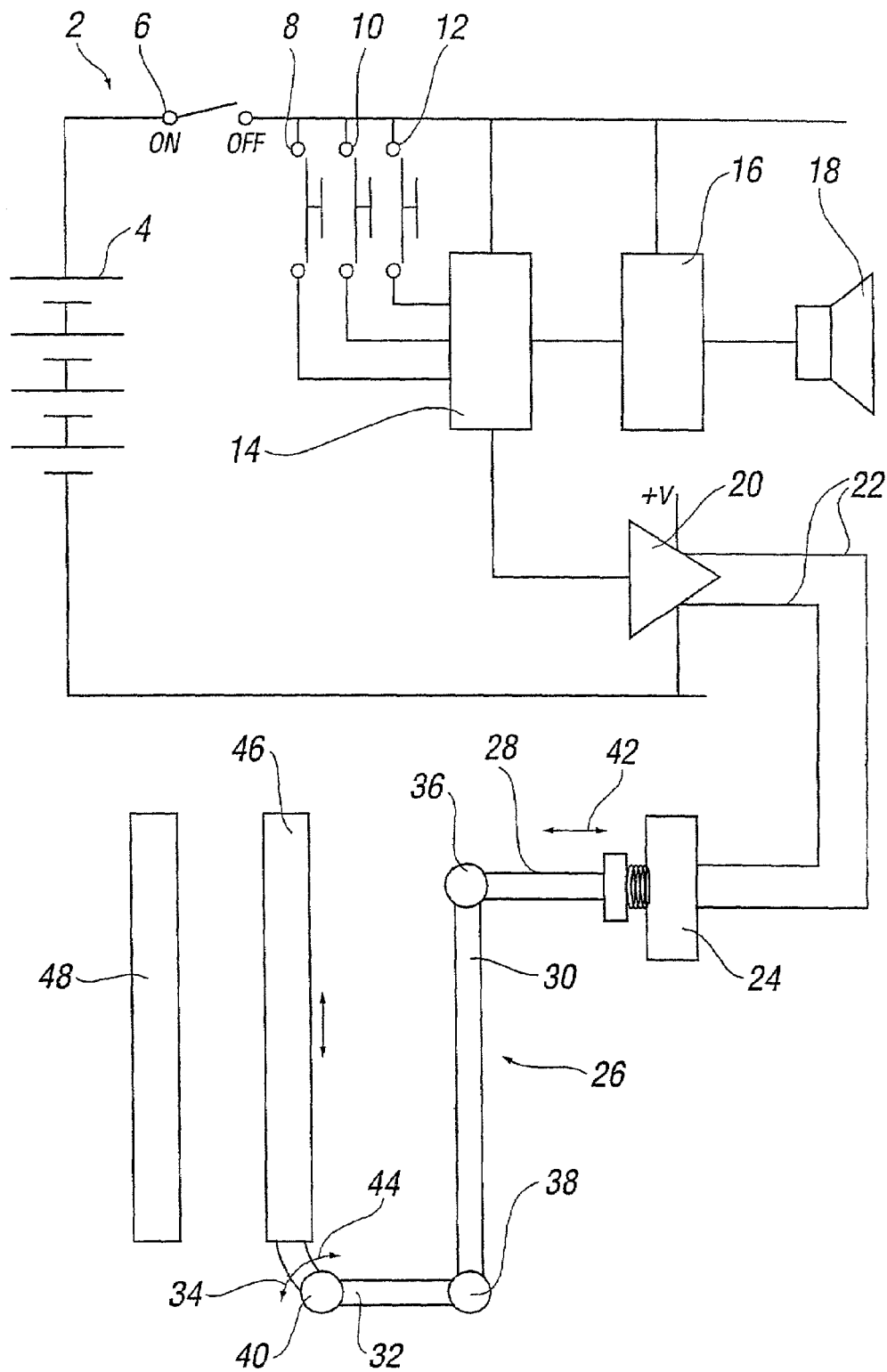
FIG. 1 shows a schematic representation of a possible circuit which may be used in conjunction with the device of the invention.

Referring firstly to FIG. 1 there is shown a typical circuit 2 used in one embodiment of the invention. The circuit includes a source of power 4 typically between 3 and 6 volts, a switch 6 operable by an observer, a plurality of PTM switches 8, 10, 12 coupled to a processor 14 which drives firstly a sound chip 16 coupled to a conventional speaker 18 and secondly an operational amplifier 20 provided with a differential output 22 which is in turn drives a voice coil 24 which may optionally be integrated within the speaker 18. The signals which are provided to the operational amplifier 20 and the sound chip 16 by the processor correspond to one another or are dependent on one another, or even equal to one another. Alternatively the signal driving the operation amplifier may be derived from the signal driving the sound chip, said derivation being effected by said processor in real time.

To said voice coil 24 there is connected a mechanical pivot arrangement 26 indicated generally at 26 and comprising links 28, 30, 32, and 34 which are all rigidly connected to one another at 36, 38, 40 respectively. The entire arrangement is permitted to pivot about the connection point 38 or other suitable point so that the horizontal back and forth motion shown at 42 of the link 28 caused by the coupling thereof to the voice coil which moves in similar manner on receipt of a suitable signal of sufficient amplitude is converted to a rotational motion of the link 34 as shown at 44.

Disposed in contact with the uppermost edge of link 34 and supported thereon is a substrate 46 having printed thereon a spliced image in accordance with known practice and disposed in front of said image is a lenticular screen 48 which overlays the image substrate 46 so that an observer only sees the image through the screen and thus only one of the many images which are spliced together in making the spliced image.

The angular motion of the link 34 causes vertical motion of the substrate 46 relative to the screen 48 which is fixed over only a small distance, typically less than or equal to the width of a single lenticule in said screen. In this manner the animated sequence of images is entirely displayed without repetition of any of the individual images.

Although the invention can be realised using rotational motion of lenticular images as described in EP982701, the practical application and utility of the invention are realised when there is relative translational movement between the lenticular image substrate the lenticular screen adjacent same. In this embodiment, the device as a whole is relatively thin and furthermore can still operate without requiring any additional depth.

In accordance with the invention, the lenticular screen is held parallel to and separated from the substrate by a distance equivalent to its focal length. (In practice this is very short and the substrate may be practically adjacent the rear surface of the lenticular screen). Alternatively if separated from the screen, the separation avoids physical abrasion between the screen and the substrate and allows for easy removal and replacement of the substrate should a different spliced image be desired to be viewed.

The lenticular screen has by preference but not uniquely its non-lenticulated side towards the observer thereby allowing the separation distance between screen and substrate, because the focal length of the screen is normally determined by the distance from the ridged lens to the surface of the substrate. By reversing the lenticular screen in this way, the aesthetic effect of the device is also enhanced as the ridges of the screen are no longer obvious to the observer and dirt traps between any lenticules are also avoided thereby improving visual effect and cleanliness. Alternatively if the ridged surface is towards the observer, then the screen can be made thinner than its focal length so that the spacing between lens and print can still be achieved to avoid friction with the print.

The images frames within the image sequence are preferably looped in arrangement so as to avoid any discontinuities in image animation during actuation of the device, and in particular the first and last image in a particular sequence are substantially the same, such as being for example an image of a character or person with its mouth shut.

The lenticular screen is also selected for its maximum pitch width relative to the finesse of detail within the spliced image so as to allow for maximum animation content. The lobe angle of the screen is maximised so as to ensure that the starting point of the image sequence corresponds to the start of the sound track. For sequences without fine detail, more than one image sequence may be printed on the substrate and viewable by using a coarser screen.

The substrate may be printed on both sides with a different spliced images so that simple reversal of the substrate can result in the display of a different animation sequence.

Ideally, the printed spliced image is activated in a vertical direction relative to the lenticular screen thereby avoiding diplopia between the left and right eye of the observer.

The start of the playback of sound is initiated by the physical finger pressure of an observer on the switch 6 or alternative said switch may be replaced with a proximity or noise sensor, or the device may be activated by voice or by a sound of particular pitch, frequency or amplitude, and the device may have a plurality of different sounds in memory which can be emitted depending on the particular activation sound.

The device may be incorporated in children's character toys, youth music CD covers, shop displays, greetings cards and as shelf talkers. Because of the nature of the animation which may be typically that of a character, puppet, human or animal face whose mouth is opening and closing, more than a single sound sequence may be played back and the nature of the invention is such that this playback will automatically be in synchronisation with the animation, provided said animation commences at the correct position in the animation sequence, which can easily be achieved in the electronics controlling the device.

By using a recordable chip, the user may record their own sound effect without any diminution in performance of the device, and indeed a microphone may be coupled to the device and the processor may be programmed to record such a sound. In this embodiment, the processor would be required to derive a drive signal for delivery to the drive mechanism.

Preferably the means of moving the printed substrate is by actuator rather than motor as described in the prior art as this allows for rapid changes in image position so as to best simulate the visual animated effects. Under certain mechanical restraints, the lenticular screen may be moved as opposed to the substrate.

Figure 2:
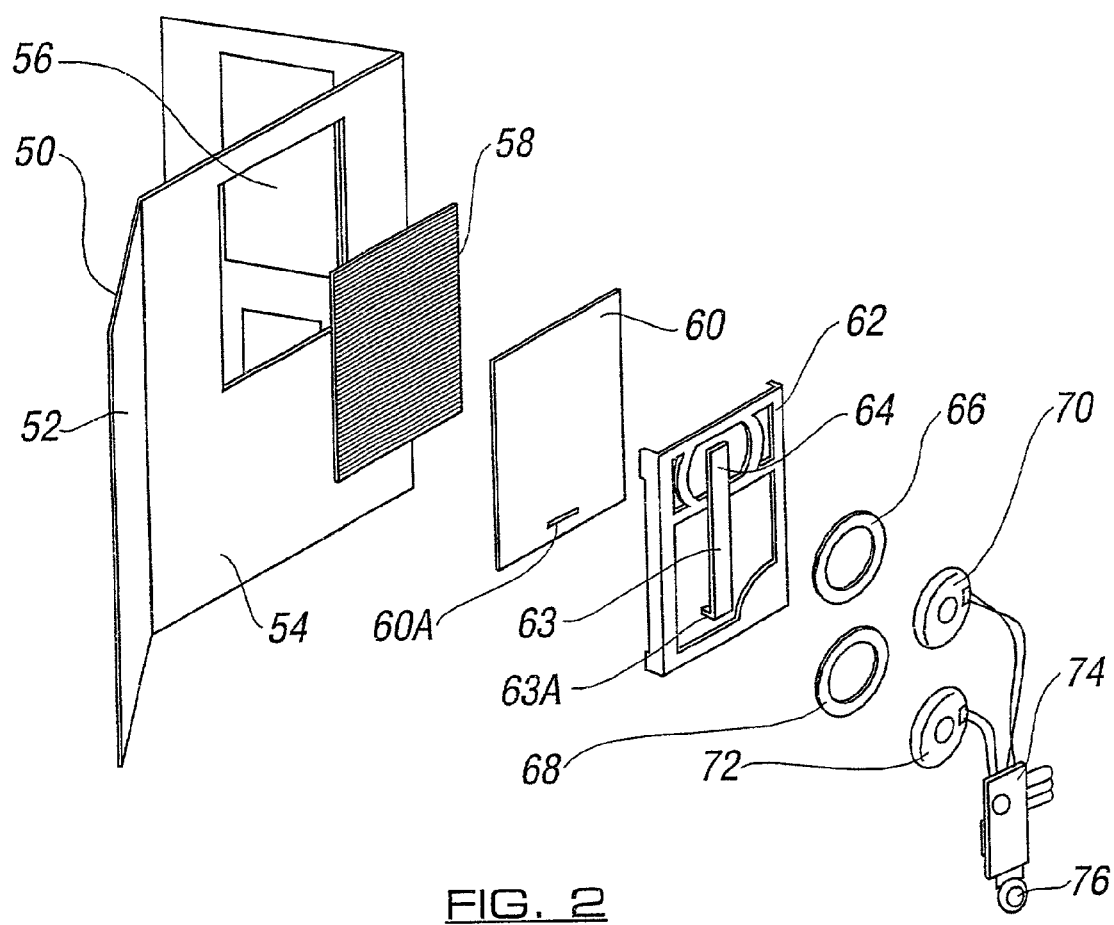
FIG. 2 shows an exploded perspective view of the various components required for an embodiment of the invention incorporated into a greeting or similar card.

Referring now to FIG. 2 there is shown an alternative embodiment of the invention wherein the device is embodied in a greetings card 50. The card has a flap 52 foldable connected to a flap 54 in which a viewing aperture 56 is provided. Suitable adhesive lines are provided on the rear surface of flap 54 and the device is position immediately behind the aperture 56 and adhered to the rear surface of said flap. The device comprises a lenticular screen 58, a substrate 60 having a spliced image printed thereon, a mounting frame 62 in which an actuator 63 is slidably mounted in the frame at 64, a pair of adhesive rings 66, 68 adhered to the upper and lower portions of the actuator 63, a drive piezo-electric element 68 and a voice piezo-electric element 72 received in the rings 66, 68, and a circuit board 74 on which are mounted the relevant electronic components together with a thin battery 76. The actuator is provided with a lip 63A which is received in a slot 60A provided in the image so any vertical linear motion of the actuator is transmitted to the image. The screen 58 is fixedly mounted to the frame 62 and thus the motion of the actuator 63 causes relative motion between the screen 58 and the image 60.

Figure 3A:
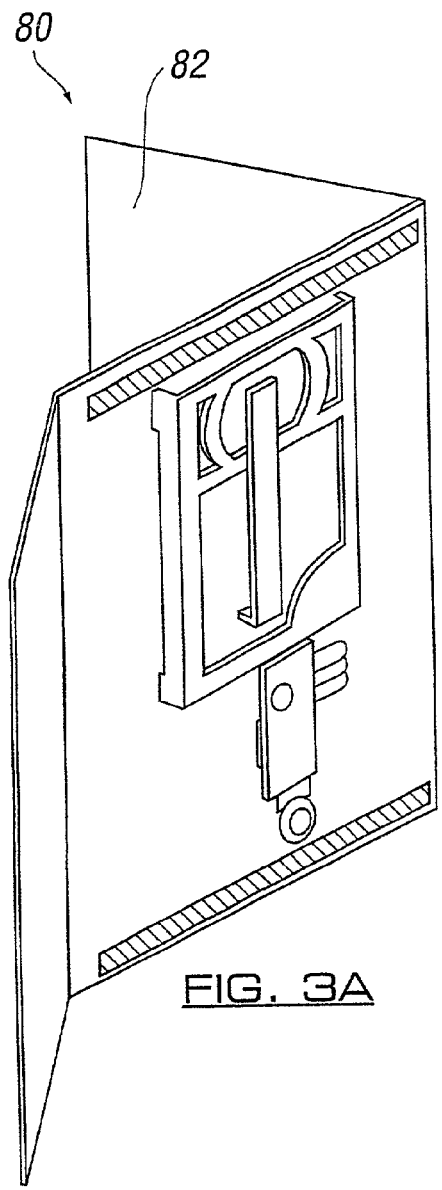
FIG. 3a, 3b, 3c shows perspective views of the assembled card from the rear, from the front when the card is closed, and from the front when the card is open.
Figure 3B:
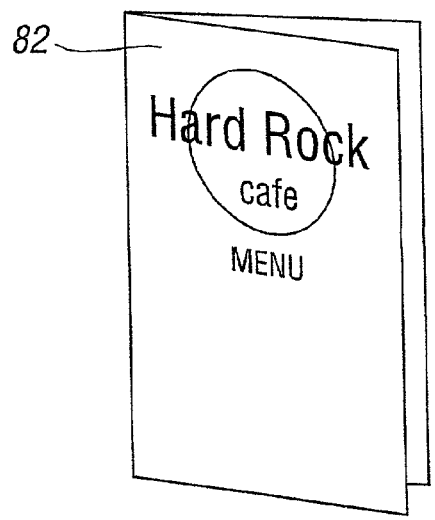
Figure 3C:
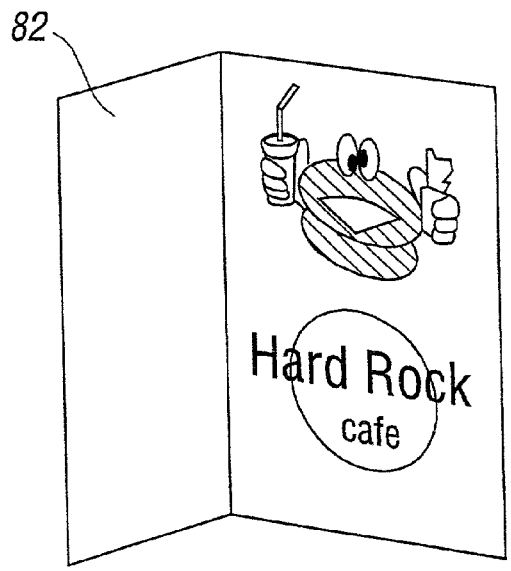

In FIG. 3a, the assembled card is shown at 80 from behind, from the front with a front flap 82 in a closed condition in FIG. 3b, and from the front with the flap 82 in an open condition in FIG. 3C.

Figure 4A:
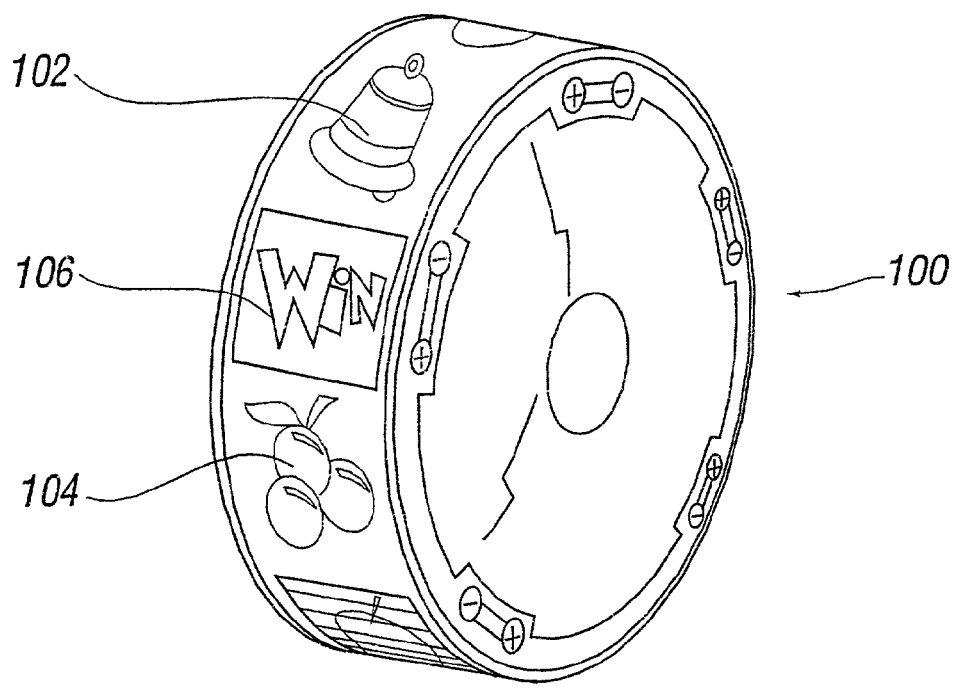
FIG. 4a, 4b show an application of the invention to the reel of a fruit machine.
Figure 4B:
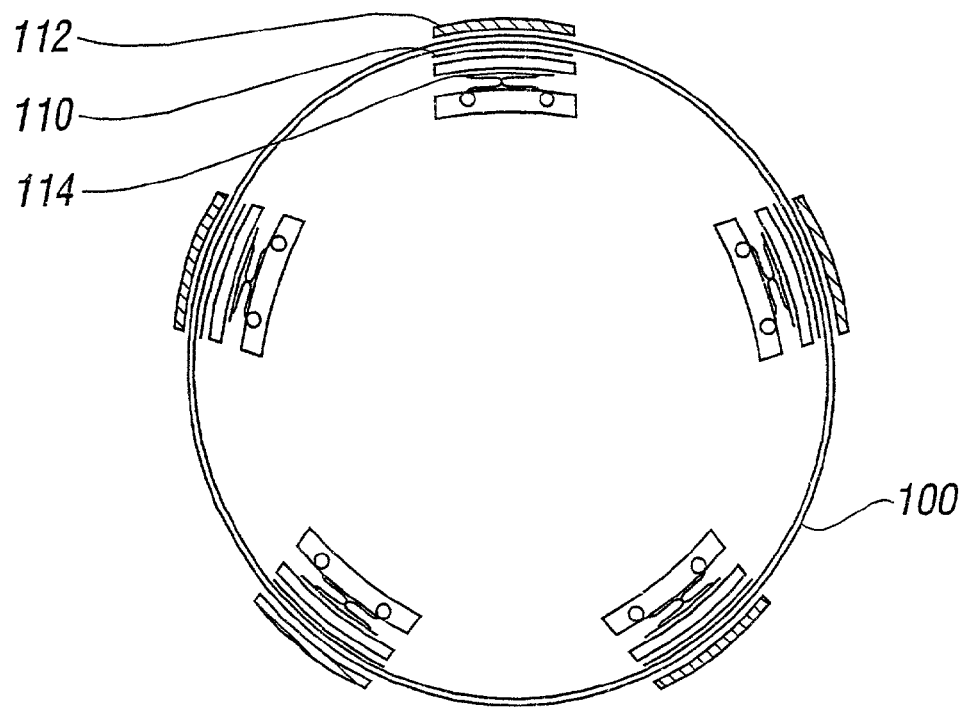

A further application is to embody the device in the reel of a fruit machine behind particular symbols, for example a winning or jackpot symbol as shown in FIGS. 4a, 4b. In these figures, a fruit machine reel 100 is shown having a number of different symbols 102, 104 printed thereon or applied thereto. Particular winning symbols 106 are provided as spliced images behind lenticular screens and operatively connected to drive means according to the invention so that when the symbol appears on the win line, the sounds emitted by the fruit machine are coupled to the devices to animate the symbols. For example in FIG. 4b, the reel 100 is shown having electronics mounted behind the particular substrates 110 printed with spliced images which are in turn disposed behind lenticular screens 112. Specifically, a piezo electric speaker 114 causes motion of the substrate which results in animation of the spliced images when view by an observer through the lenticular screen.

Figure 5:
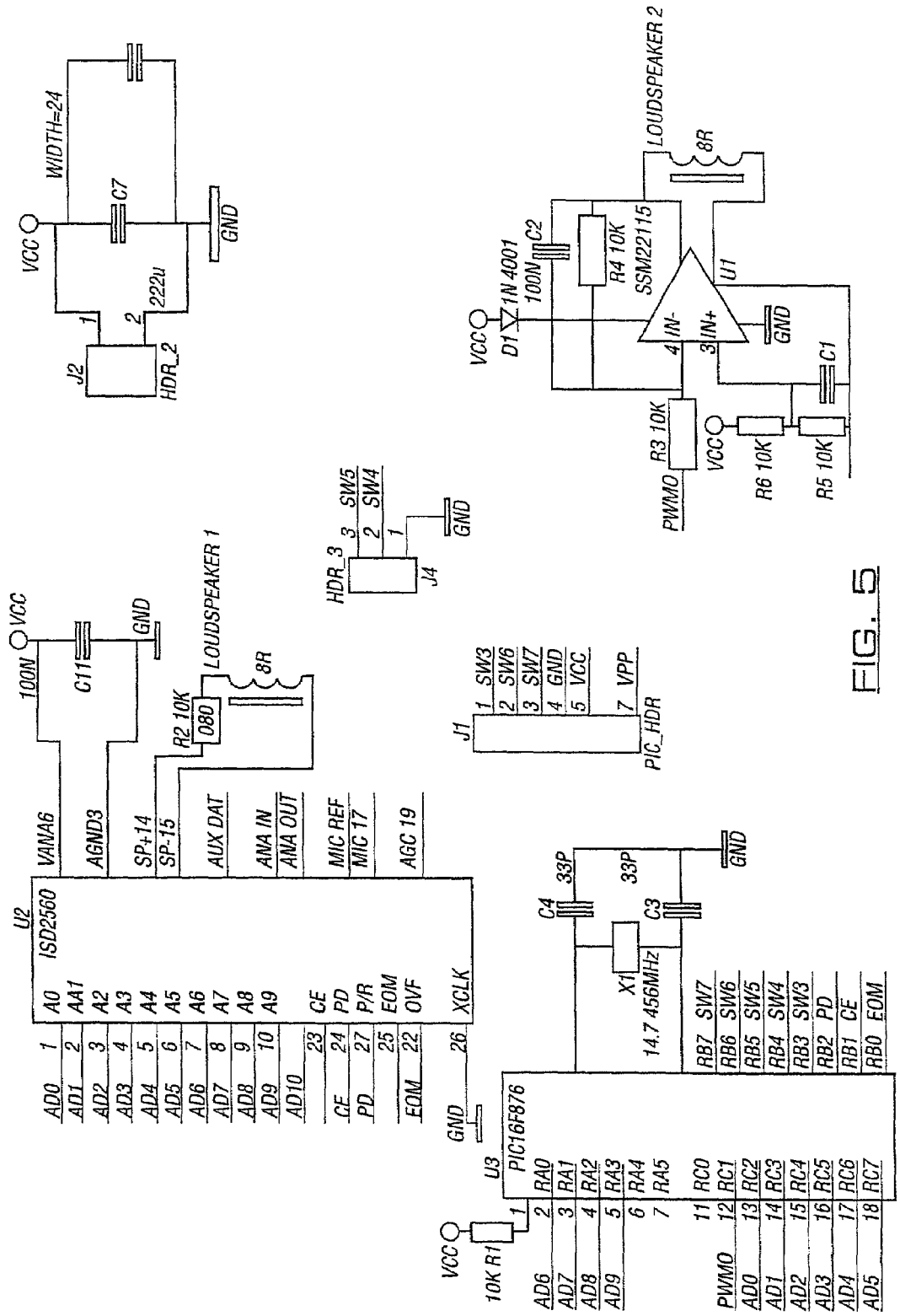
FIG. 5 shows a more detailed circuit diagram useful for implementing the embodiment of the invention where a loudspeaker element is used as the driver mechanism, and where the drive signal is derived prior to delivery of the sound signal to the sound generation means.

Referring now to FIG. 5 there is shown a schematic circuit diagram 200 in which there is provided a main processor module U3, a sound chip U2 and a driver module U1. Additional modules J1, J2 J4 necessary in the functioning of the circuit are also shown. Module U2 includes a sound processor labelled ISD2560 which is connected to a loundspeaker coil labelled LOUDSPEAKER1. This loudspeaker audibly emits the sound sample.

In operation, the processor module U3 communicates with sound chip U2 when the user depresses a start button on the device connected to one of the SW lines, labelled SW3–SW7 on U3. U2 drives LOUDSPEAKER1 which makes the audible sound. The sound signal from which the sample is reconstructed by the sound chip ISD2560 which is pre-programmed thereon.

U3 monitors the elapsed time since the initiation of the sound playback and sends a pre-programmed pulse width modulated waveform (signal PWM0) to the driver module U1. It will be immediately understood by those skilled in the art that U1 is configured as a low pass filter and differential driver to position the lenticular image (or lens) accurately. This is done by controlling the DC current in the lenticular positioning coil (LOUDSPEAKER2) precisely. As the current is varied in the coil, the lenticular image changes position at a rate controlled by U3 thus changing the speed and duration of the animation sequence to give the illusion of lip synchronous movement of the character in the image with the sound emanating from the loudspeaker LOUDSPEAKER1.

Figure 6:
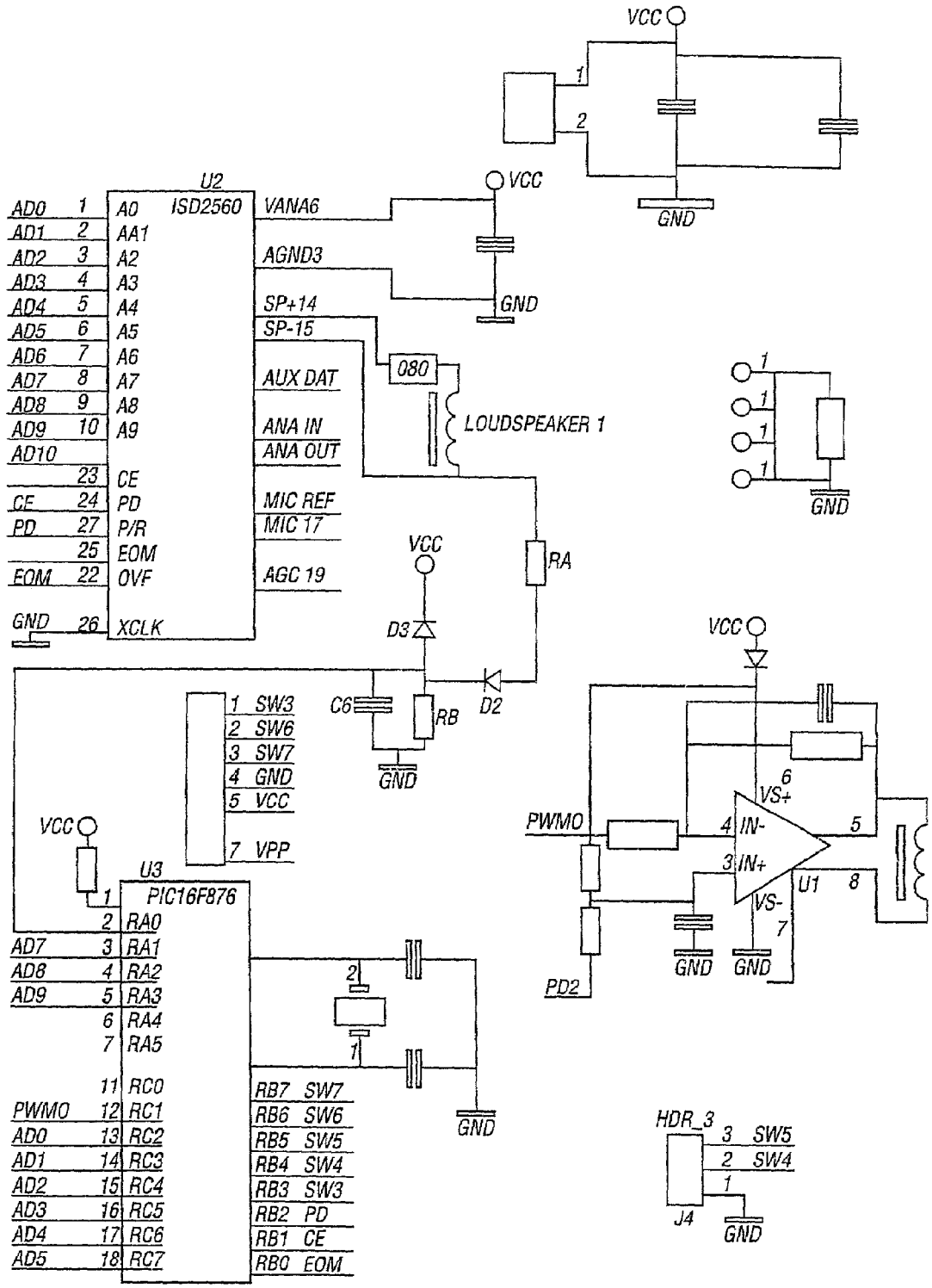
FIG. 6 shows a modified arrangement of the circuit of FIG. 5 which is useful for implementing the aspect of the invention wherein the driver signal is derived in real-time by the processor.

In accordance with a further aspect of the invention FIG. 6 shows a modified arrangement of the circuit diagram of FIG. 5 in that the signal passing through LOUDSPEAKER1, the sound signal within the meaning of the invention, is fed through a rectification means comprising resistances RA, RB, diodes D2, D3 and a capacitor C6. The resulting rectified signal passes into pin two designated as RA0 in the processor U3 which then performs a threshold analysis on said received signal. When said processor determines that the sound level represented by said received rectified signal is above a predetermined threshold, U3 forces one cycle of movement of the lenticular image. When that cycle is complete, U3 again checks the level of sound and continues to move the image while the sound is loud enough. When the sound level, and thus the received rectified signal drops, U3 stops the motion of the image but only after a complete cycle of motion to ensure a consistent rest position for the image.

Figure 7:
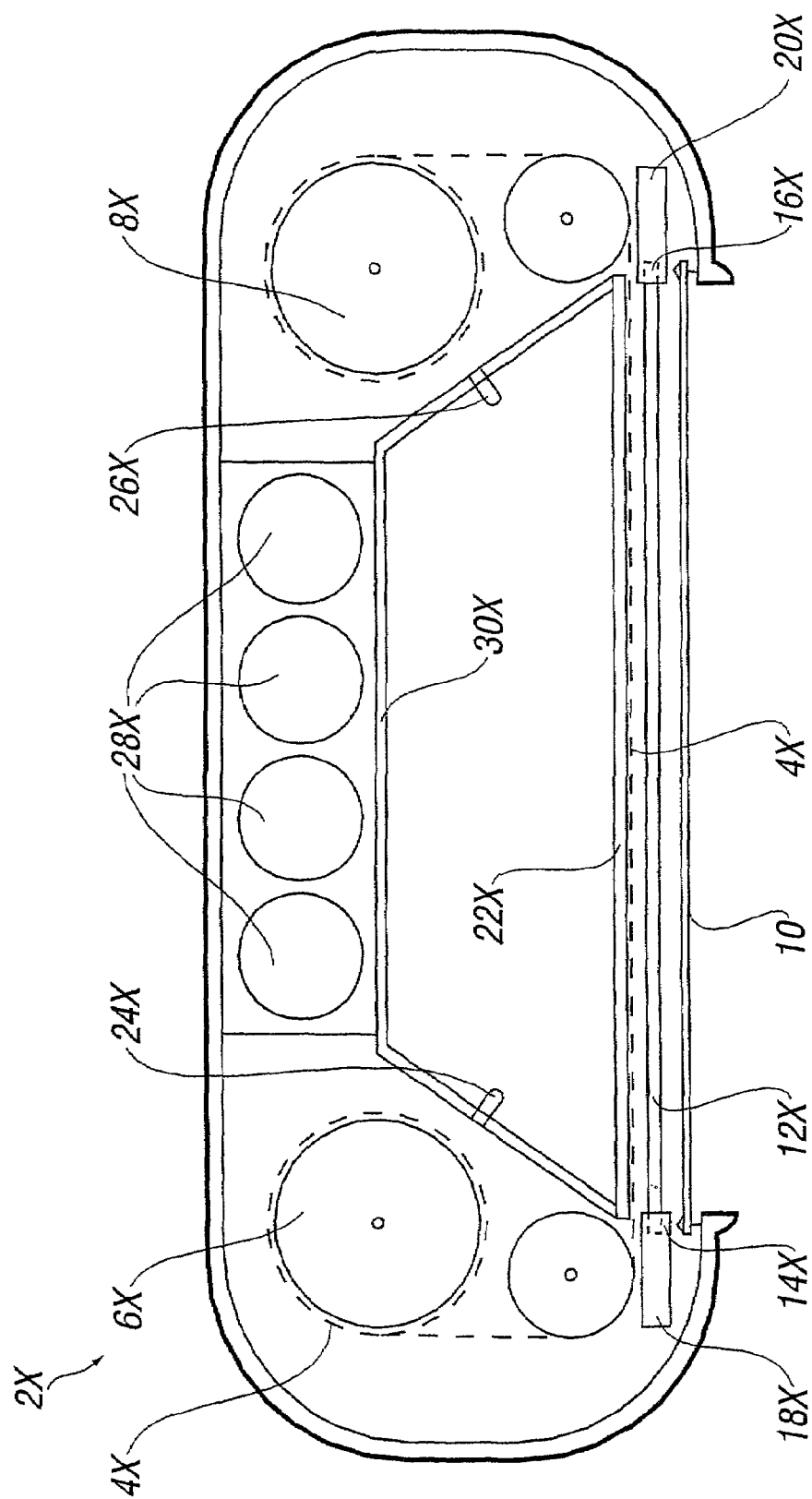
FIG. 7 shows a schematic plan view of the inside of a device adapted for displaying a plurality of individual images printed on a scroll.

Referring now to FIG. 7, there is shown a schematic representation of a scrolling backlit TV device 2X which is adapted for the display of a number of individual lenticular images printed on a scroll 4X which can be unwound from an wound onto a pair of rollers 6X, 8X, the particular individual lenticular image on display at any one time being viewable through a substantially square outer mirrored screen 10X behind which a lenticular lens 12X is provided and retained at its edges within slots 14X, 16X in retainers 18X, 20X.

As can be seen from the figure, in the region of the outer mirrored screen 10X, the scroll is maintained in a substantially flat condition against a diffuser 22X which is ideally provided with a film on the surface with which the scroll 4X comes into contact to ensure as great an image definition as possible. Krypton bulbs 24X, 26X are provided behind the diffuser 22X and illuminate the image printed on the scroll 4X immediately behind lenticular lens 12X. Said bulbs are powered by batteries 28X.

Ideally, the diffuser 22X has a rear portion 30X disposed behind the bulbs which is provided with a reflective coating to enhance the illumination of the image printed on the scroll 4X.

Figure 8A:
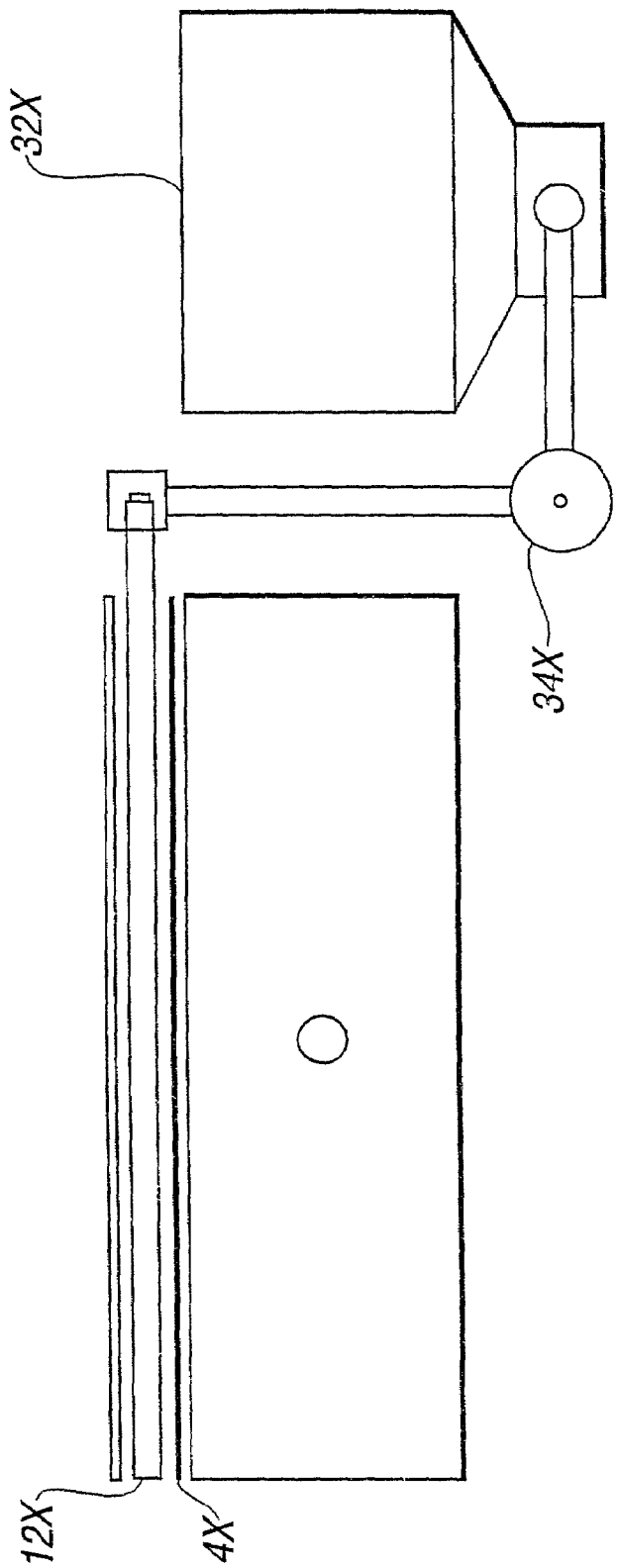

Referring now to FIG. 8A, it can be seen from this schematic that a voice coil or other suitable sound emitting apparatus 32X is mechanically or electronically linked at 34X to the lenticular screen 12X behind which the printed scroll 4X is disposed. In accordance with the invention, the scroll 4X is printed with individual lenticular images, one of which is shown at 36X in FIG. 8B, and additionally a specific indicator mark 38X will also be printed on said scroll proximate an edge thereof so that a sensor 40X can detect said indicator mark 38X to provide a sensor signal to the processing apparatus of the device 34X which will then coordinate which of the various sound samples stored in the memory associated with said process is to be played on receipt of a request signal. The processor 34X additionally controls the vertical movement of the lenticular screen 10X between predetermined limits such that on receipt of a request signal, the processor both plays back the sound sample associated with the particular image currently being displayed, and simultaneously causes the appearance of synchronised animation of the image 36X by mechanically displacing said lenticular screen 10X in a vertical direction by suitable means. It is to be mentioned that the means used to vertically displace said lenticular screen are not an essential element of this invention, and accordingly there is no description provided herein.

It is also to be mentioned that the device 2X may be provided with remote control signal sensing means which on receipt of a predetermined remote control signal, cause activation of a motor (not shown) which drive the rollers 6X, 8X, which may be operatively coupled by a worm gear arrangement so that there is no differential rotation thereof and the scroll 4X is unwound from one roller at the same speed at which it is wound onto the alternate roller, the overall impression to a child user being similar to that of a conventional television which can be controlled by remote control.

Figure 9:
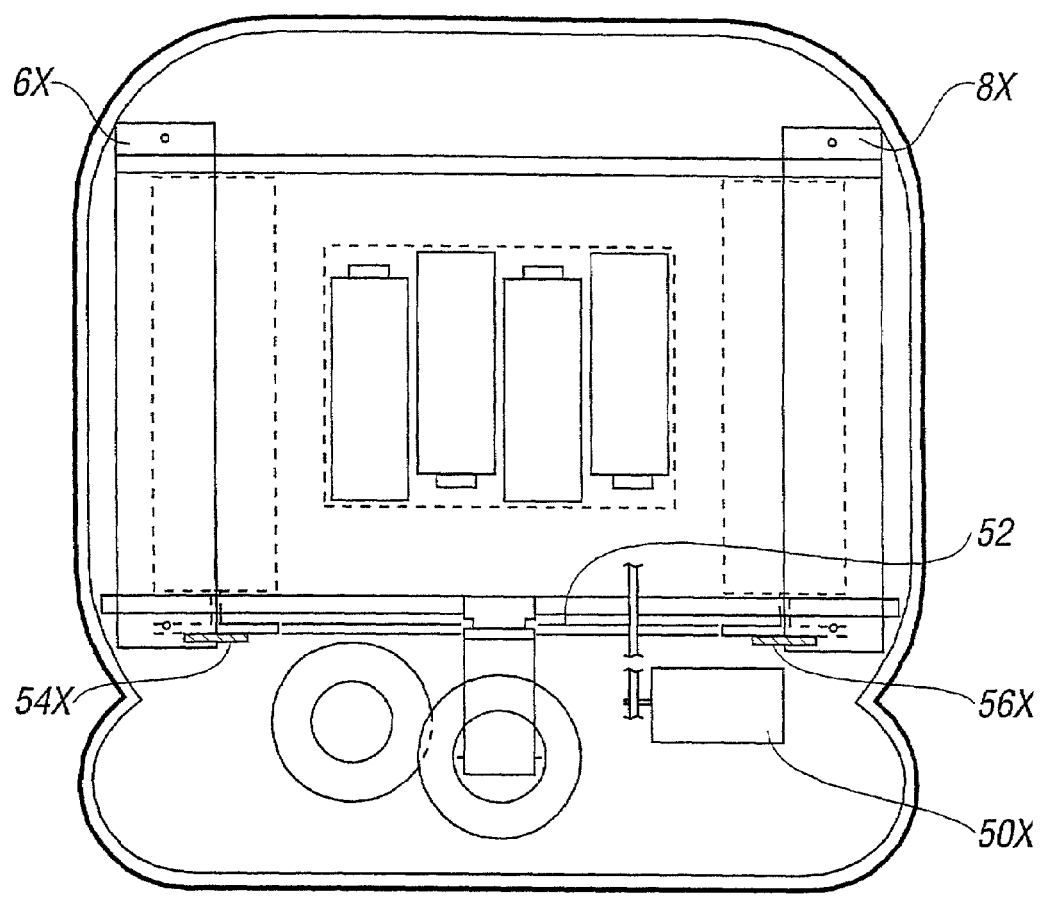
FIG. 9 shows a schematic front elevation of the device of FIG. 1.

FIG. 9 shows a front elevation of the device, and in particular a motor 50X is shown being mechanically coupled to a connection rod 52X having worm gears 54X, 56X at either end thereof which control the rotations of the rollers 6X, 8X. Although the motor 50X may be operatively actuated by remote control means, these are not fundamentally necessary, and a simple switch mechanism allowing actuation of the motor in either direction to cause movement of the scroll behind the lenticular lens by a discrete and predetermined amount for each actuation may be provided.

Figure 10:
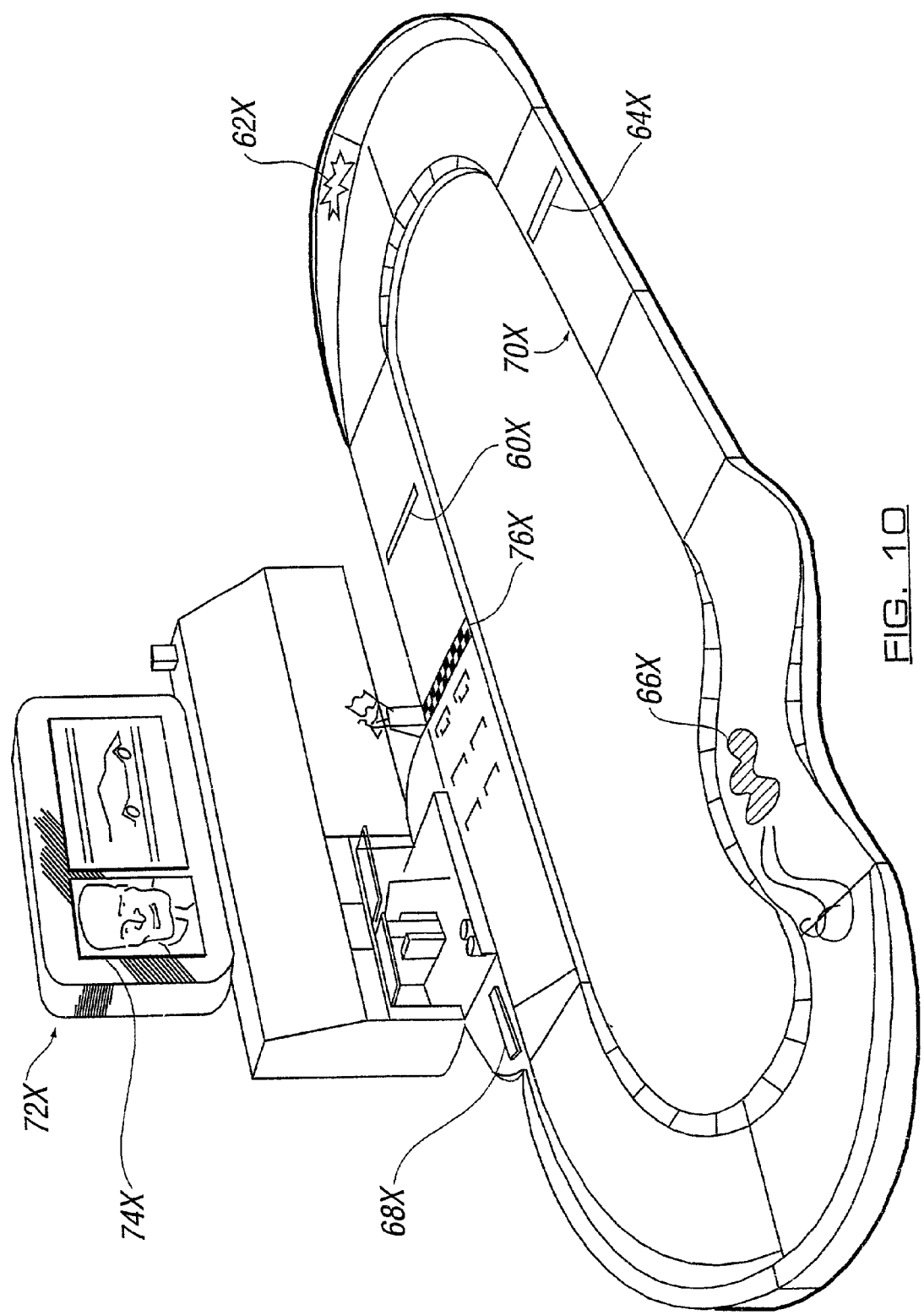
FIG. 10 shows a perspective schematic representation of an additional aspect of the invention wherein a plurality of sensors is provided.

FIG. 10 shows a second aspect of the invention in which a plurality of sensors 60X, 62X, 64X, 66X, 68X are provided at various locations around a child's racetrack indicated generally at 70X. Said sensors 60X to 68X are coupled to a device 72X according to the invention which is provided internally with processor means and various other components including a lenticular image 74X which may be animated in synchronisation with one of a number of individual sound samples stored in memory associated with the processor means. In use, vehicles (not shown) travelling around the racetrack 70X and over the sensors 60X to 68X will cause the transmission of sensor signals to the device 72X, which will accordingly cause playback of a particular sound sample associated with an event which might occur at the particular sensor which transmitted the signal. For example, sensor 60X is located approximate a start/finish line 76X on the racetrack, and the particular sound sample associated with this sensor may be related to the completion of a race, a victory, or other suitable sound by which could foreseeably be said by a commentator watching a race.

Figure 11:
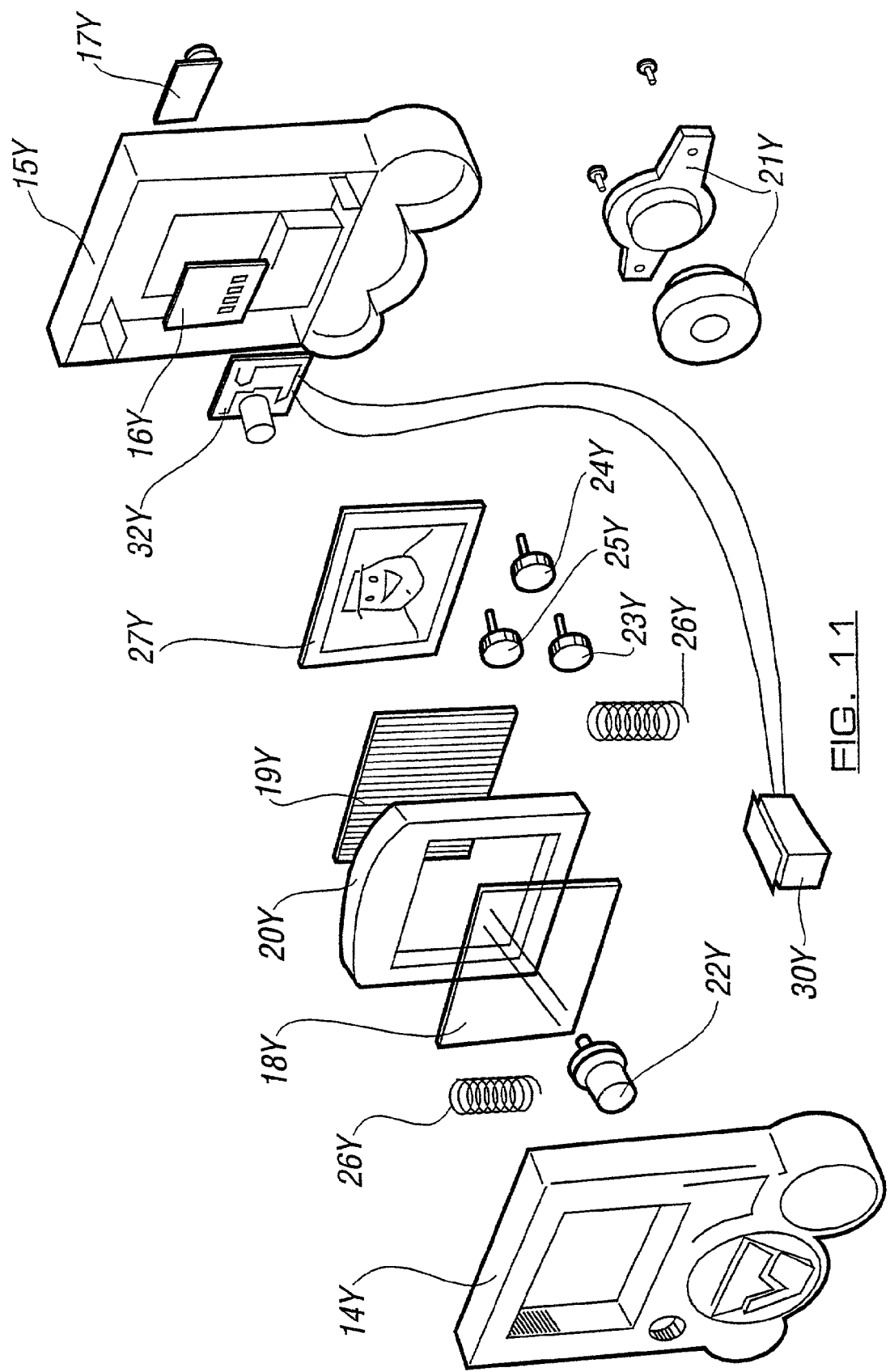
FIG. 11 shows a schematic perspective view of a yet further embodiment of the invention.

Referring finally to FIG. 11, there is shown a yet further embodiment of the invention wherein the activation of the animation sequence and synchronised sound sample playback is achieved by physically depressing all elements of the device within a housing against a spring. In the Figure, a small backpack for a toy is schematically illustrated consisting of plastic backpack front 14Y and rear 15Y between which is disposed the inventive device. A battery door 17Y is also provided in the rear 15Y.

Specifically, a lenticular substrate 27Y having a spliced lenticular image printed thereon is disposed behind a lenticular lens 19Y, and both are disposed above a collection of damping gears 23Y, 24Y, 25Y. A pair of compression springs 26Y are provided to support the assembly which is disposed inside a lens holder 20Y at the front of which is provided a window panel 18Y. A push button 22Y is provided which emerges through a suitable aperture in the backpack front 14Y which can be used to depress the entire assembly towards the backpack rear 15Y and against a contact locator 16Y. Provided that the assembly is depressed to a sufficiently great degree, the contact locator triggers the playback of sound through the speaker assembly 21Y, and a drive mechanism 30Y driven by electronics 32Y in accordance with the invention causes the motion of either the lenticular substrate 27Y or the lens 19Y in synchronisation with the sound playback.

In addition to this slight vertical or lateral motion of the substrate or lens, the entire assembly is also recovering against the damping gears and moving back towards the backpack front 14Y. This effect is particularly appealing to young children and furthermore the various components which constitute the article shown in the figure can be made quite robustly to withstand the abuse to which it might be subjected.

The skilled reader will instantly appreciate that this invention has a potentially vast number of different applications as the invention provides an extremely simple cost effective means of producing short animated televisual sequences with seemingly synchronised sound without any requirement for conventional audio-visual apparatus. The skilled reader will also appreciate that modifications and alterations may be made to the invention while still falling within the scope of this application.

What is claimed is:

1. An image display device comprising a lenticular image which allows the display of a plurality of individual images in succession by means of the displacement of one or more of the elements of the lenticular image to provide an animation sequence, said device further comprising sound generation means capable of converting a sound signal into sounds of a predetermined duration being sounds of the type an observer would expect to hear on seeing the animation sequence, said lenticular image being displaced by a drive mechanism actuated in response to a drive signal to allow an observer to see the animation sequence, said drive signal being derived manually or electronically from said sound signal in real time or prior to the delivery of said sound signal to the sound generation means, said driver signal being delivered to said driver means substantially simultaneously with the delivery of the sound signal to the sound generation means, wherein in that the animation sequence viewable during the motion of the lenticular image is repeated a number of times and for varying periods of time determined by the drive signal during the time that the single sound sample is reproduced by the sound generating means to give the appearance that the animation sequence is of the same duration as the sound sample and that said animation sequence is synchronised with the sound sample, wherein a combined sound and drive signal is stored in the memory of a sound chip and passed through a circuit which splits the drive signal from the sound signal for subsequent delivery of each respectively to drive mechanism and sound generation mechanism.

2. A device according to claim 1 wherein the drive signal and sound signal are combined into a single signal delivered to the sound generation means which causes the reproduction of the sound sample by means of speaker coil movement, said drive mechanism consisting of a mechanical link between the moving element of said sound generation mechanism and the lenticular image or an element thereof.

3. A device according to claim 2 wherein the drive mechanism is any mechanism which produces a positive mechanical displacement dependent on the magnitude and/or direction or sign of the current through or potential difference across the mechanism.

4. A device according to claim 2 wherein the drive mechanism includes a stepper motor.

5. A device according to claim 2 wherein the drive mechanism includes a transducer.

6. A device according to claim 2 wherein the drive mechanism includes a mechanically driven cam arrangement wherein the lenticular image or an element thereof rests on the cam which is driven rotationally to move the lenticular image or an element thereof back and forth.

7. A device according to claim 1 wherein the drive mechanism is any mechanism which produces a positive mechanical displacement dependent on the magnitude and/or direction or sign of the current through or potential difference across the mechanism.

8. A device according to claim 1 wherein the drive mechanism includes a stepper motor.

9. A device according to claim 1 wherein the drive mechanism includes a transducer.

10. A device according to claim 1 wherein the drive mechanism includes a mechanically driven cam arrangement wherein the lenticular image or an element thereof rests on the cam which is driven rotationally to move the lenticular image or an element thereof back and forth.

11. A device according to claim 1 wherein the device includes processor means which controls the operation of both a sound chip and the drive mechanism on receipt of an initiation signal ensuring that the sound signal and the drive signal are delivered to the sound generation means and the drive mechanism respectively simultaneously.

12. A device according to claim 11 wherein the processor communicates with one or more sound chips having memory associated therewith in which are stored a plurality of different sound signals representative of different sound samples, said processor further communicating with both the said sound chip and one or more sensors which deliver a sensor signals to said processor which subsequently causes the delivery of one or other of the stored sound signals to the sound generation means depending on the sensor signal received.

13. A device according to claim 12 wherein for each stored sound signal there is an associated derived drive signal stored in memory associated with the processor.

14. A device according to claim 12 wherein the processor can derive drive signals corresponding to each of the store sound signals in real time.

15. A device according to claim 12 wherein the lenticular image in the device is changeable and the one or more sensors deliver a sensor signal to the processor indicative of the particular lenticular image at any time on display within the device.

16. A device according to claim 15 wherein one or other or both of the processor and the one or more sound chips can be re-programmed.

17. A device according to claim 15 wherein a plurality of images are contained within the device and the device further includes means for changing which of the lenticular images is on display at any one time.

18. A device according to claim 17 wherein the device includes means for scrolling and indexing a web of material behind a lenticular screen, said web having been printed with a plurality of lenticular images which can be singularly viewed behind the lenticular screen on the selection of the user of the device, the drive mechanism causing movement of the screen to animate the image therebehind.

19. A device according to claim 18 wherein a remote control feature is included in the device to allow a user to remotely cause a change in displayed lenticular image.

20. A device according to claim 15 wherein the user may place different image cards in a suitably shaped receiver, the sensor means detecting which of a plurality of images has been inserted and causing playback in the relevant sound sample associated with that image.

21. A device according to claim 15 wherein indicator means is provided proximate each individual image at any time displayed by the device, said indicator means being detectable by the sensor which delivers the corresponding sensor signal to the processor.

22. A device according to claim 11 wherein that the processor communicates with memory incorporated in a mobile telecommunications device into which one or more sound samples can be downloaded.

23. A device according to claim 22 wherein said processor prevents the delivery of a particular sound signal representative of a particular sound sample unless a successful comparison is achieved between a sensor signal and a signal identifying a particular sound signal.

24. A device according to claim 23 wherein said processor receives the identifying signal from said mobile telecommunications device containing said particular sound sample prior to playback thereof.

25. A method for operating a novelty device having a lenticular image selectively caused to move by a drive mechanism and associated sound generating means both of which are controlled by electronics, the movement of said lenticular image allowing the viewing of a plurality of discreet images consecutively which together make up an animation sequence and the method allowing the novelty device to give the appearance that the sound emitted thereby is synchronised to the animation, said method including the steps of delivering a sound signal representative of a sound sample of a predetermined duration to the sound generating means which reproduce said sound sample, deriving a drive signal from said sound signal either in real time or prior to delivery of said sound signal to said sound generating means and delivering said drive signal to said drive mechanism to cause movement of said lenticular image, wherein the animation sequence viewable during the motion of the lenticular image is repeated a number of times and for varying periods of time determined by the drive signal during the time that the single sound sample is reproduced by the sound generating means such that the animation is of the same duration as the sound sample and that said animation sequence is synchronised with the sound sample and wherein the duration of each repetition of the animation sequence is dependent upon the frequency of movement determined by the drive signals which are generated during each particular repetition and the length of each said repetition varies between successive repetitions during the playback of the sound sample.

26. A method according to claim 25 wherein the sound signal is pre-programmed in the electronics.

27. A method according to claim 25 wherein the lenticular image consists of a plurality of individual images spliced together, each of said images being of the face of a person or character having a mouth of varying stages of openness, and the sound sample consists substantially of speech.

28. A method according to claim 27 wherein the initial image viewable in the animation sequence is that of the face of a character or person having their mouth closed, the animation sequence showing that character or person subsequently opening and then closing their mouth.

29. A method according to claim 28 wherein the drive signal is derived prior to the delivery of the sound signal to the sound generating means.

30. A method according to claim 29 wherein the drive signal is derived such that the animation sequence is repeated for each syllable of speech reproduced by the sound generating means.

31. A method according to claim 30 wherein the duration of each repetition of the animation sequence which is determined by the drive signal varies between each repetition depending on the length of each syllable of speech contained in the sound sample.

32. A method according to claim 31 wherein the lenticular image is caused to move gradually at the beginning and end of the animation sequence by means of a drive signal which is ramped at both the beginning and end of each peak.

33. A method according to claim 32 wherein the peaks in the drive signal are maintained for a suitable time depending on the duration of a particular syllable in the speech which constitutes the sound sample.

34. A method according to claim 28 wherein the drive signal is determined in real time electronically using a processor to which the sound signal is delivered in addition to its delivery to said sound generating means, said processor analysing said sound signal for characteristic peaks indicative of syllabic enunciation in speech.

35. A method according to claim 34 which the processor creates a drive signal based on an algorithm which detects when the peaks in one or more of the characteristics of the input sound signal exceed a predetermined level.

36. A method according to claim 35 wherein filter means are employed to remove high frequency artefacts from the sound signal prior to algorithmic processing of the sound signal.

37. A method according to claim 25 wherein the lenticular image is caused to move gradually at the beginning and end of the animation sequence by means of suitably damping the drive mechanism so that the delivery of a stepwise-type drive signal to the drive mechanism results in the gradual motion of the lenticular image.

* * * * *